Patented Nov. 12, 1935

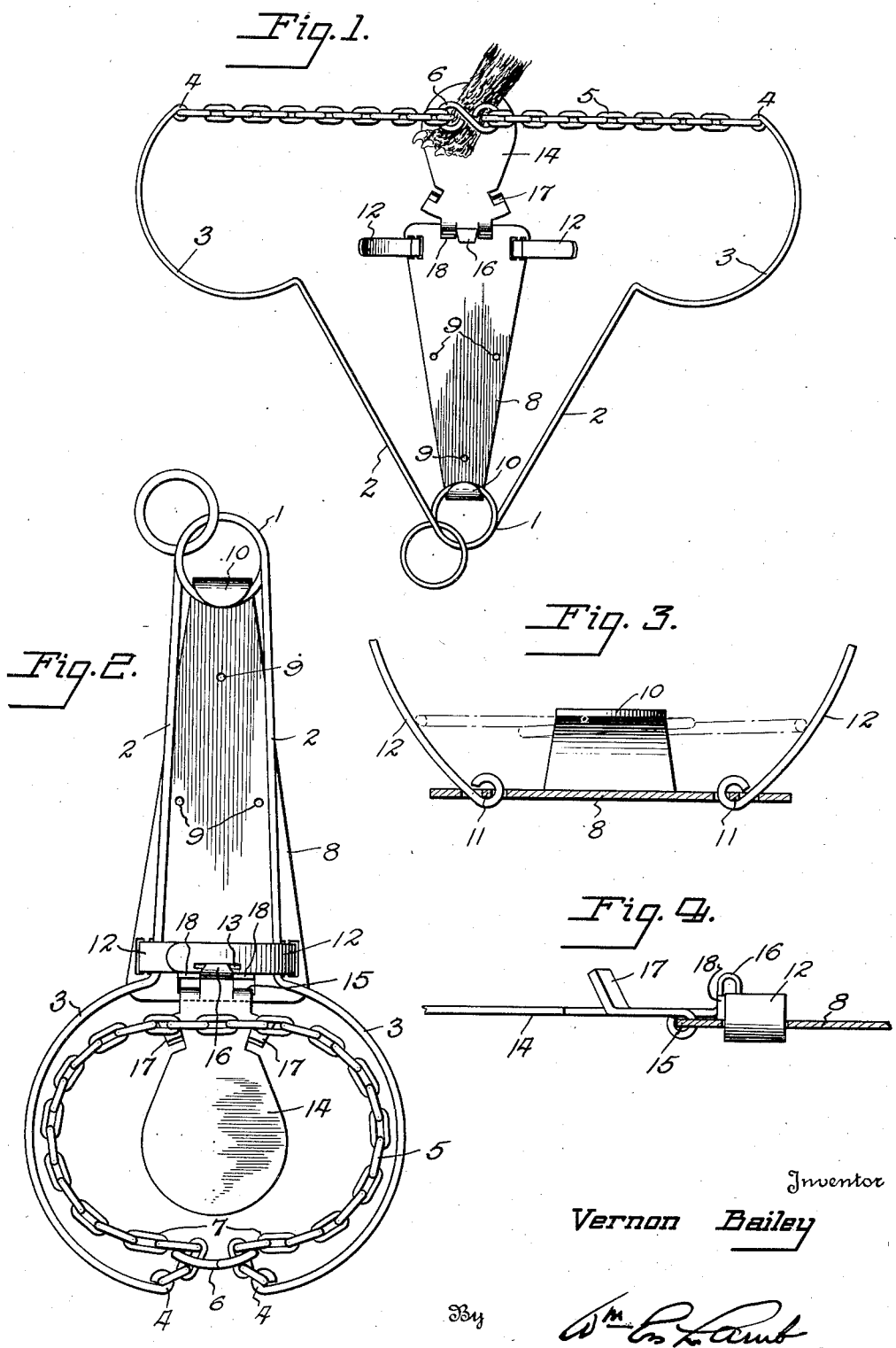

2,020,598

UNITED STATES PATENT OFFICE 2,020,598

ANIMAL TRAP

Vernon Bailey, Washington, D. C.

Application October 4, 1934, Serial No. 746,910

10 Claims. (Cl. 43—87)

This invention relates to animal traps and more particularly to that type of traps designed to securely hold the trapped animal without injury or pain.

The object of the invention is to provide an improved and simplified structure lending itself to economical manufacture and embodying more efficient positive and facil means for setting the trap, and means rendering the operation of the trap more certain.

The invention consists in the novel construction, arrangement and combinations of parts as hereinafter more particularly described and claimed.

One sheet of drawing accompanies this specification as part thereof in which like reference characters indicate like parts throughout.

Fig. 1 is a plan view of the assembled trap sprung.

Fig. 2 is a plan view of the assembled trap set.

Fig. 3 is a fragmentary view partly in cross section illustrating the bow holding and guiding arms.

Fig. 4 is a fragmentary view partly in cross section showing the bow holding and guiding arms in set position.

The invention contemplates an animal holding device comprising a bow member having two arms 2—2 with means such as an intermediary spring coil 1 for forcing said arms 2—2 normally towards axial alignment except as restrained by the flexible member, preferably a chain 5. The outer parts of arms 2—2 are bent into an arcuate shape as at 3 these arcuate end parts being oppositely disposed so as to constitute a substantially circular form when the arms 2—2 are flexed into the set position as illustrated in Fig. 2. The flexible member or chain 5 is secured at its ends to terminal loops 4—4 on the members 3—3 and this chain is looped through an 8 shaped guide member 6 to form a noose 7. The guide member 6 is preferably bent on its long axis to an arcuate shape by means of which the chain can pass through its loops with the maximum ease when the noose 7 is contracted by the springing of the trap.

The invention further contemplates means for holding, releasing and guiding the animal holding device thus described, comprising a base part 8 which is provided with holes 9 for nails to hold same to a sub base if desired. One end of the base is bent upward and over to form a lug 10 adapted to engage the bow coil 1. To the other end of the base is pivoted a pan 14 which is provided adjacent the hinge pivot 15 with a latch member 16 formed integral with the pan and which extends over the base 8 as indicated in Fig. 4. The pan proper is of substantially circular or oval shape and smaller in size than the circular guide loop formed by the bow members 3—3 when in set position and is adapted to be positioned centrally of that loop and of the extended noose 7 when the trap is set as shown in Fig. 2. Two arcuate lugs 17—17 are struck up marginally from pan 14 adjacent its hinge which lugs extend obliquely inwardly toward the center of the pan and operate when the trap is sprung to slightly retard the contraction of the noose 7 and simultaneously direct same upwardly centrally of the pan.

On opposite sides of base 8 are mounted on pivots 11—11 perpendicular to the pivot 15 of pan 14, two arcuate bow holding and guiding members 12—12 in such a manner that these members will when folded inwardly overlap the contracted or flexed bow arms 2—2. The upper of these members is provided with a shallow groove 13 into which the latch 16 will seat thus holding the bow members flexed and the trap set. The orbit of these members 12—12 is restricted so that in the opposite or sprung position they will be restricted to a position extending obliquely upward and outward as illustrated in Fig. 3. By reason of this construction and limited orbit it will be apparent that upon the springing of the trap by an animal placing its foot upon pan 14 the members 12—12 will be forced open by bow arms 2—2 which arms 2—2 will in turn be forced through a cam action on said members 12—12 upwardly as they spread out thus throwing noose 7 well up on the leg of the animal and directly above pan 14.

It will be noted that the members 12—12 thus function both as bow holding and guiding members.

The limited orbit of the members 12—12 is obtained in the embodiment of the invention illustrated in which sheet metal is stamped out to provide the various pivots, by cutting part of the base away on each side of the pivots 11—11 so that parts of the base remain on each side of these pivots to operate as stops for the members 12—12. This same type of construction suggests the use of part of the base struck up to form pivot 15 for the pan 14 and indicated at 18 as an abutment against which the overlapped members 12—12 may rest. Obviously however, the limited orbit of members 12—12 may be obtained in various ways suitable to any type of construction which will be obvious to any skilled mechanic.

It will further be noted that after the trap is sprung the bow and noose are entirely independent of the base and pan. It is therefore necessary to secure the bow as through a ring secured through coil 1 and a swivel to a chain or other suitable tether (not shown) by means of which the animal is given considerable freedom of movement while its foot is held firmly in the noose. Efforts to escape will be met at the limit of the tether by a resilient flexing of the bow but the pressure of the noose on the leg will not be unduly or painfully increased.

Having thus fully described my invention, I claim:

1. In a trap having a bow member and a noose operable thereby, a control device comprising a base member, a pan pivoted on the base and having a latch, and pivoted bow engaging and guiding members mounted on the base adapted to overlap over the bow member when the latter is flexed and be engaged by the latch on the pan.

2. The structure of claim 1 in which the bow engaging and guiding members are pivoted with a limited orbit.

3. The structure of claim 1 in which the latch is integral with the pan.

4. The structure of claim 1 in which the bow engaging and guiding members are pivoted with a limited orbit permitting their overlapping the flexed bow members at one extreme and their extending upward and obliquely outward at the other extreme of their rocking movement.

5. The structure of claim 1 with marginal guides on the pan adjacent its pivot.

6. The structure of claim 1 with marginal guides on the pan disposed substantially arcuate with respect to its center and inclined inwardly and upwardly.

7. In a trap of the type indicated, a bow comprising two arms, means intermediate said arms adapted to force said arms normally toward axial alignment, arcuate extensions on said arms oppositely disposed with a flexible member formed into a noose and having its ends secured to the ends of said arcuate extensions, and releasable means for holding the arms of the bow flexed.

8. In a trap of the type indicated having a bow and a flexible member, a noose forming guide of 8 shape bent on its longitudinal axis into arcuate form and disposed on the flexible member so that the center of its arc will substantially coincide with the center of the noose, and releasable means for holding the arms of the bow flexed.

9. In a trap, a bow member comprising arms, means for normally flexing said arms toward axial alignment, oppositely disposed arcuate extensions on the free ends of said arms adapted together when the arms are flexed to form a substantially circular frame, a noose formed in a flexible member the ends of which are secured to the ends of the arcuate extensions, said noose adapted in size when extended to conform with the said circular frame and a control device comprising a base, bow securing and guiding members hingedly mounted on the base with a limited orbit which at one extreme permits said members to overlap the flexed bow arms and at the other extreme to extend upwardly and outwardly, a substantially circular pan of a size less than the circular form on the bow when the latter is flexed, said pan pivoted on the base and adapted to extend, when the trap is set centrally of the form and the noose, a latch fixed to the pan to engage the bow securing members, and arcuate marginal guides on the pan adjacent to its pivot.

10. The structure of claim 1 in which the bow engaging and guiding members have their inner faces arcuate to constitute cam surfaces adapted to force the bow arms upwardly.

VERNON BAILEY.